United States Patent
Gelmini

(10) Patent No.: US 8,975,770 B2
(45) Date of Patent: Mar. 10, 2015

(54) WIND POWER TURBINE ELECTRIC GENERATOR AND WIND POWER TURBINE EQUIPPED WITH AN ELECTRIC GENERATOR

(75) Inventor: Emmanuele Gelmini, Trento (IT)

(73) Assignee: Wilic S.AR.L., Luxembourg (LU)

( * ) Notice: Subject to any disclaimer, the term of this patent is extended or adjusted under 35 U.S.C. 154(b) by 460 days.

(21) Appl. No.: 13/091,680

(22) Filed: Apr. 21, 2011

(65) Prior Publication Data

US 2012/0098268 A1     Apr. 26, 2012

(30) Foreign Application Priority Data

Apr. 22, 2010    (IT) ............................. MI2010A0694

(51) Int. Cl.
| | |
|---|---|
| *F03B 13/00* | (2006.01) |
| *H02P 9/04* | (2006.01) |
| *H02K 1/18* | (2006.01) |
| *F03D 9/00* | (2006.01) |
| *H02K 7/102* | (2006.01) |
| *H02K 7/18* | (2006.01) |
| *F03D 7/02* | (2006.01) |

(52) U.S. Cl.
CPC ................ *H02K 1/185* (2013.01); *F03D 9/002* (2013.01); *H02K 7/102* (2013.01); *H02K 7/1838* (2013.01); *F03D 7/0248* (2013.01); *F05B 2220/7066* (2013.01); *H02K 2201/03* (2013.01); *H02K 2213/09* (2013.01); *Y02E 10/725* (2013.01)
USPC .................................. 290/54; 290/44; 290/55

(58) Field of Classification Search
USPC .................... 290/55, 44; 310/268; 416/244 R
See application file for complete search history.

(56) References Cited

U.S. PATENT DOCUMENTS

| | | | |
|---|---|---|---|
| 1,894,357 | A | 1/1933 | Manikowske et al. |
| 1,948,854 | A | 2/1934 | Heath |
| 1,979,813 | A | 11/1934 | Reis |
| 2,006,172 | A | 6/1935 | Klappauf |

(Continued)

FOREIGN PATENT DOCUMENTS

| | | |
|---|---|---|
| CA | 2404939 | 4/2004 |
| CA | 2518742 | 9/2004 |

(Continued)

OTHER PUBLICATIONS

Maxime R. Dubous, Henk Polinder, Study of TFPM Machines with Toothed Rotor Applied to Direct-Drive Generators for Wind Turbines, 2004.

(Continued)

*Primary Examiner* — Tulsidas C Patel
*Assistant Examiner* — Thomas Quigley
(74) *Attorney, Agent, or Firm* — Neal, Gerber & Eisenberg LLP

(57) ABSTRACT

A wind power turbine electric generator, the electric generator having a tubular first supporting structure extending about an axis of rotation; a second supporting structure extending about the axis of rotation, substantially coaxial with the first supporting structure, and fitted to the first supporting structure to rotate about the axis of rotation; first active parts fitted to the first supporting structure; second active parts fitted to the second supporting structure, facing the first active parts, and separated from the first active parts by an annular gap; and a radial tensioning device configured to adjust the shape of the first supporting structure about the axis of rotation.

23 Claims, 5 Drawing Sheets

(56) References Cited

U.S. PATENT DOCUMENTS

| | | |
|---|---|---|
| 2,040,218 A | 5/1936 | Soderberg |
| 2,177,801 A | 10/1939 | Erren |
| 2,469,734 A | 5/1949 | Ledwith |
| 2,496,897 A | 2/1950 | Strickland |
| 2,655,611 A | 10/1953 | Sherman |
| 2,739,253 A | 3/1956 | Plumb |
| 2,806,160 A | 9/1957 | Brainard |
| 2,842,214 A | 7/1958 | Prewitt |
| 2,903,610 A | 9/1959 | Bessiere |
| 3,004,782 A | 10/1961 | Meermans |
| 3,072,813 A | 1/1963 | Reijnst et al. |
| 3,083,311 A | 3/1963 | Krasnow |
| 3,131,942 A | 5/1964 | Ertaud |
| 3,168,686 A | 2/1965 | King et al. |
| 3,221,195 A | 11/1965 | Hoffmann |
| 3,363,910 A | 1/1968 | Toronchuk |
| 3,364,523 A | 1/1968 | Schippers |
| 3,392,910 A | 7/1968 | Tanzberger |
| 3,468,548 A | 9/1969 | Webb |
| 3,700,247 A | 10/1972 | Butler et al. |
| 3,724,861 A | 4/1973 | Lesiecki |
| 3,746,349 A | 7/1973 | Smale et al. |
| 3,748,089 A | 7/1973 | Boyer et al. |
| 3,789,252 A | 1/1974 | Abegg |
| 3,841,643 A | 10/1974 | McLean |
| 3,860,843 A | 1/1975 | Kawasaki et al. |
| 3,942,026 A | 3/1976 | Carter |
| 3,963,247 A | 6/1976 | Nommensen |
| 3,968,969 A | 7/1976 | Mayer et al. |
| 4,022,479 A | 5/1977 | Orlowski |
| 4,060,744 A * | 11/1977 | Starcevic ................ 310/91 |
| 4,061,926 A | 12/1977 | Peed |
| 4,087,698 A | 5/1978 | Myers |
| 4,273,343 A | 6/1981 | Visser |
| 4,289,970 A | 9/1981 | Deibert |
| 4,291,235 A | 9/1981 | Bergey, Jr. et al. |
| 4,292,532 A | 9/1981 | Leroux |
| 4,336,649 A | 6/1982 | Glaser |
| 4,339,874 A | 7/1982 | Mc'Carty et al. |
| 4,348,604 A | 9/1982 | Thode |
| 4,350,897 A | 9/1982 | Benoit |
| 4,354,126 A | 10/1982 | Yates |
| 4,368,895 A | 1/1983 | Okamoto et al. |
| 4,398,773 A | 8/1983 | Boden et al. |
| 4,452,046 A | 6/1984 | Valentin |
| 4,482,831 A | 11/1984 | Notaras et al. |
| 4,490,093 A | 12/1984 | Chertok et al. |
| 4,517,483 A | 5/1985 | Hucker et al. |
| 4,517,484 A | 5/1985 | Dacier |
| 4,521,026 A | 6/1985 | Eide |
| 4,585,950 A | 4/1986 | Lund |
| 4,613,779 A | 9/1986 | Meyer |
| 4,638,200 A | 1/1987 | Le Corre et al. |
| 4,648,801 A | 3/1987 | Wilson |
| 4,694,654 A | 9/1987 | Kawamura |
| 4,700,096 A | 10/1987 | Epars |
| 4,714,852 A | 12/1987 | Kawada et al. |
| 4,720,640 A | 1/1988 | Anderson et al. |
| 4,722,661 A | 2/1988 | Mizuno |
| 4,724,348 A | 2/1988 | Stokes |
| 4,761,590 A | 8/1988 | Kaszman |
| 4,792,712 A | 12/1988 | Stokes |
| 4,801,244 A | 1/1989 | Stahl |
| 4,866,321 A | 9/1989 | Blanchard et al. |
| 4,900,965 A | 2/1990 | Fisher |
| 4,906,060 A | 3/1990 | Claude |
| 4,973,868 A | 11/1990 | Wust |
| 4,976,587 A | 12/1990 | Johnston et al. |
| 5,004,944 A | 4/1991 | Fisher |
| 5,063,318 A | 11/1991 | Anderson |
| 5,090,711 A | 2/1992 | Becker |
| 5,091,668 A | 2/1992 | Cuenot et al. |
| 5,177,388 A | 1/1993 | Hotta et al. |
| 5,191,255 A | 3/1993 | Kloosterhouse et al. |
| 5,275,139 A | 1/1994 | Rosenquist |
| 5,280,209 A | 1/1994 | Leupold et al. |
| 5,281,094 A | 1/1994 | McCarty et al. |
| 5,298,827 A | 3/1994 | Sugiyama |
| 5,302,876 A | 4/1994 | Iwamatsu et al. |
| 5,311,092 A | 5/1994 | Fisher |
| 5,315,159 A | 5/1994 | Gribnau |
| 5,331,238 A | 7/1994 | Johnsen |
| 5,410,997 A | 5/1995 | Rosenquist |
| 5,419,683 A | 5/1995 | Peace |
| 5,456,579 A | 10/1995 | Olson |
| 5,483,116 A | 1/1996 | Kusase et al. |
| 5,506,453 A | 4/1996 | McCombs |
| 5,579,800 A | 12/1996 | Walker |
| 5,609,184 A | 3/1997 | Apel et al. |
| 5,663,600 A | 9/1997 | Baek et al. |
| 5,670,838 A | 9/1997 | Everton |
| 5,696,419 A | 12/1997 | Rakestraw et al. |
| 5,704,567 A | 1/1998 | Maglieri |
| 5,746,576 A | 5/1998 | Bayly |
| 5,777,952 A | 7/1998 | Nishimura et al. |
| 5,783,894 A | 7/1998 | Wither |
| 5,793,144 A | 8/1998 | Kusase et al. |
| 5,798,632 A | 8/1998 | Muljadi |
| 5,801,470 A | 9/1998 | Johnson et al. |
| 5,811,908 A | 9/1998 | Iwata et al. |
| 5,814,914 A | 9/1998 | Caamaño |
| 5,844,333 A | 12/1998 | Sheerin |
| 5,844,341 A | 12/1998 | Spooner et al. |
| 5,857,762 A | 1/1999 | Schwaller |
| 5,886,441 A | 3/1999 | Uchida et al. |
| 5,889,346 A | 3/1999 | Uchida et al. |
| 5,894,183 A | 4/1999 | Borchert |
| 5,925,964 A | 7/1999 | Kusase et al. |
| 5,952,755 A | 9/1999 | Lubas |
| 5,961,124 A | 10/1999 | Muller |
| 5,973,435 A | 10/1999 | Irie et al. |
| 5,986,374 A | 11/1999 | Kawakami |
| 5,986,378 A | 11/1999 | Caamaño |
| 6,013,968 A | 1/2000 | Lechner et al. |
| 6,037,692 A | 3/2000 | Miekka et al. |
| 6,064,123 A | 5/2000 | Gislason |
| 6,067,227 A | 5/2000 | Katsui et al. |
| 6,089,536 A | 7/2000 | Watanabe et al. |
| 6,093,984 A | 7/2000 | Shiga et al. |
| 6,127,739 A | 10/2000 | Appa |
| 6,172,429 B1 | 1/2001 | Russell |
| 6,177,746 B1 | 1/2001 | Tupper et al. |
| 6,193,211 B1 | 2/2001 | Watanabe et al. |
| 6,194,799 B1 | 2/2001 | Miekka et al. |
| 6,215,199 B1 | 4/2001 | Lysenko et al. |
| 6,232,673 B1 | 5/2001 | Schoo et al. |
| 6,278,197 B1 | 8/2001 | Appa |
| 6,285,090 B1 | 9/2001 | Brutsaert et al. |
| 6,326,711 B1 | 12/2001 | Yamaguchi et al. |
| 6,365,994 B1 | 4/2002 | Watanabe et al. |
| 6,373,160 B1 | 4/2002 | Schrödl |
| 6,376,956 B1 | 4/2002 | Hosoya |
| 6,378,839 B2 | 4/2002 | Watanabe et al. |
| 6,384,504 B1 | 5/2002 | Ehrhart et al. |
| 6,417,578 B1 | 7/2002 | Chapman et al. |
| 6,428,011 B1 | 8/2002 | Oskouei |
| 6,452,287 B1 | 9/2002 | Looker |
| 6,452,301 B1 | 9/2002 | Van Dine et al. |
| 6,455,976 B1 | 9/2002 | Nakano |
| 6,472,784 B2 | 10/2002 | Miekka et al. |
| 6,474,653 B1 | 11/2002 | Hintenlang et al. |
| 6,476,513 B1 | 11/2002 | Gueorguiev |
| 6,483,199 B2 | 11/2002 | Umemoto et al. |
| 6,492,743 B1 | 12/2002 | Appa |
| 6,492,754 B1 | 12/2002 | Weiglhofer et al. |
| 6,499,532 B1 | 12/2002 | Williams |
| 6,504,260 B1 | 1/2003 | Debleser |
| 6,515,390 B1 | 2/2003 | Lopatinsky et al. |
| 6,520,737 B1 | 2/2003 | Fischer et al. |

(56) References Cited

U.S. PATENT DOCUMENTS

| | | |
|---|---|---|
| 6,548,932 B1 | 4/2003 | Weiglhofer et al. |
| 6,590,312 B1 | 7/2003 | Seguchi et al. |
| 6,603,232 B2 | 8/2003 | Van Dine et al. |
| 6,617,747 B1 | 9/2003 | Petersen |
| 6,629,358 B2 | 10/2003 | Setiabudi et al. |
| 6,664,692 B1 | 12/2003 | Kristoffersen |
| 6,676,122 B1 | 1/2004 | Wobben |
| 6,683,397 B2 | 1/2004 | Gauthier et al. |
| 6,700,260 B2 | 3/2004 | Hsu et al. |
| 6,700,288 B2 | 3/2004 | Smith |
| 6,707,224 B1 | 3/2004 | Petersen |
| 6,720,688 B1 | 4/2004 | Schiller |
| 6,727,624 B2 | 4/2004 | Morita et al. |
| 6,746,217 B2 | 6/2004 | Kim et al. |
| 6,759,758 B2 | 7/2004 | Martinez |
| 6,762,525 B1 | 7/2004 | Maslov et al. |
| 6,781,276 B1 | 8/2004 | Stiesdal et al. |
| 6,784,564 B1 | 8/2004 | Wobben |
| 6,794,781 B2 | 9/2004 | Razzell et al. |
| 6,828,710 B1 | 12/2004 | Gabrys |
| 6,844,656 B1 * | 1/2005 | Larsen et al. ............... 310/268 |
| 6,856,042 B1 | 2/2005 | Kubota |
| 6,879,075 B2 | 4/2005 | Calfo et al. |
| 6,888,262 B2 | 5/2005 | Blakemore |
| 6,891,299 B2 | 5/2005 | Coupart et al. |
| 6,903,466 B1 | 6/2005 | Mercier et al. |
| 6,903,475 B2 | 6/2005 | Ortt et al. |
| 6,906,444 B2 | 6/2005 | Hattori et al. |
| 6,911,741 B2 | 6/2005 | Pettersen et al. |
| 6,921,243 B2 | 7/2005 | Canini et al. |
| 6,931,834 B2 | 8/2005 | Jones |
| 6,933,645 B1 | 8/2005 | Watson |
| 6,933,646 B2 | 8/2005 | Kinoshita |
| 6,942,454 B2 | 9/2005 | Ohlmann |
| 6,945,747 B1 | 9/2005 | Miller |
| 6,949,860 B2 | 9/2005 | Hama et al. |
| 6,951,443 B1 | 10/2005 | Blakemore |
| 6,972,498 B2 | 12/2005 | Jamieson et al. |
| 6,983,529 B2 | 1/2006 | Ortt et al. |
| 6,984,908 B2 | 1/2006 | Rinholm et al. |
| 6,987,342 B2 | 1/2006 | Hans |
| 6,998,729 B1 | 2/2006 | Wobben |
| 7,004,724 B2 | 2/2006 | Pierce et al. |
| 7,008,172 B2 | 3/2006 | Selsam |
| 7,008,348 B2 | 3/2006 | LaBath |
| 7,016,006 B2 | 3/2006 | Song |
| 7,021,905 B2 | 4/2006 | Torrey et al. |
| 7,028,386 B2 | 4/2006 | Kato et al. |
| 7,033,139 B2 | 4/2006 | Wobben |
| 7,038,343 B2 | 5/2006 | Agnes et al. |
| 7,042,109 B2 | 5/2006 | Gabrys |
| 7,057,305 B2 | 6/2006 | Krüger-Gotzmann et al. |
| 7,075,192 B2 | 7/2006 | Bywaters et al. |
| 7,081,696 B2 | 7/2006 | Ritchey |
| 7,088,024 B2 | 8/2006 | Agnes et al. |
| 7,091,642 B2 | 8/2006 | Agnes et al. |
| 7,095,128 B2 | 8/2006 | Canini et al. |
| 7,098,552 B2 | 8/2006 | McCoin |
| 7,109,600 B1 | 9/2006 | Bywaters et al. |
| 7,111,668 B2 | 9/2006 | Rürup |
| 7,116,006 B2 | 10/2006 | McCoin |
| 7,119,469 B2 | 10/2006 | Ortt et al. |
| 7,154,191 B2 | 12/2006 | Jansen et al. |
| 7,161,260 B2 | 1/2007 | Krüger-Gotzmann et al. |
| 7,166,942 B2 | 1/2007 | Yokota |
| 7,168,248 B2 | 1/2007 | Sakamoto et al. |
| 7,168,251 B1 | 1/2007 | Janssen |
| 7,179,056 B2 | 2/2007 | Siegfriedsen |
| 7,180,204 B2 | 2/2007 | Grant et al. |
| 7,183,665 B2 | 2/2007 | Bywaters et al. |
| 7,196,446 B2 | 3/2007 | Hans |
| 7,205,678 B2 | 4/2007 | Casazza et al. |
| 7,217,091 B2 | 5/2007 | LeMieux |
| 7,259,472 B2 | 8/2007 | Miyake et al. |
| 7,281,501 B2 | 10/2007 | Leufen et al. |
| 7,285,890 B2 | 10/2007 | Jones et al. |
| 7,323,792 B2 | 1/2008 | Sohn |
| 7,345,376 B2 | 3/2008 | Costin |
| 7,358,637 B2 | 4/2008 | Tapper |
| 7,377,163 B2 | 5/2008 | Miyagawa |
| 7,385,305 B2 | 6/2008 | Casazza et al. |
| 7,385,306 B2 | 6/2008 | Casazza et al. |
| 7,392,988 B2 | 7/2008 | Moldt et al. |
| 7,417,334 B2 * | 8/2008 | Uchiyama ................ 290/55 |
| 7,427,814 B2 | 9/2008 | Bagepalli et al. |
| 7,431,567 B1 | 10/2008 | Bevington et al. |
| 7,443,066 B2 | 10/2008 | Salamah et al. |
| 7,458,261 B2 | 12/2008 | Miyagawa |
| 7,482,720 B2 | 1/2009 | Gordon et al. |
| 7,548,008 B2 | 6/2009 | Jansen et al. |
| 7,550,863 B2 | 6/2009 | Versteegh |
| 7,594,800 B2 | 9/2009 | Teipen |
| 7,687,932 B2 | 3/2010 | Casazza et al. |
| 2002/0047418 A1 | 4/2002 | Seguchi et al. |
| 2002/0047425 A1 | 4/2002 | Coupart et al. |
| 2002/0056822 A1 | 5/2002 | Watanabe et al. |
| 2002/0063485 A1 | 5/2002 | Lee et al. |
| 2002/0089251 A1 | 7/2002 | Tajima et al. |
| 2002/0148453 A1 | 10/2002 | Watanabe et al. |
| 2003/0011266 A1 | 1/2003 | Morita et al. |
| 2003/0102677 A1 | 6/2003 | Becker et al. |
| 2003/0137149 A1 | 7/2003 | Northrup et al. |
| 2003/0230899 A1 | 12/2003 | Martinez |
| 2004/0066098 A1 | 4/2004 | Doherty et al. |
| 2004/0086373 A1 | 5/2004 | Page, Jr. |
| 2004/0094965 A1 | 5/2004 | Kirkegaard et al. |
| 2004/0119292 A1 | 6/2004 | Datta et al. |
| 2004/0150283 A1 | 8/2004 | Calfo et al. |
| 2004/0151575 A1 | 8/2004 | Pierce et al. |
| 2004/0151577 A1 | 8/2004 | Pierce et al. |
| 2004/0189136 A1 | 9/2004 | Kolomeitsev et al. |
| 2005/0002783 A1 | 1/2005 | Hiel et al. |
| 2005/0002787 A1 | 1/2005 | Wobben |
| 2005/0082836 A1 | 4/2005 | Lagerwey |
| 2005/0082839 A1 | 4/2005 | McCoin |
| 2005/0230979 A1 | 10/2005 | Bywaters et al. |
| 2005/0280264 A1 | 12/2005 | Nagy |
| 2006/0000269 A1 | 1/2006 | LeMieux et al. |
| 2006/0001269 A1 | 1/2006 | Jansen et al. |
| 2006/0006658 A1 | 1/2006 | McCoin |
| 2006/0012182 A1 | 1/2006 | McCoin |
| 2006/0028025 A1 | 2/2006 | Kikuchi et al. |
| 2006/0066110 A1 | 3/2006 | Jansen et al. |
| 2006/0071575 A1 | 4/2006 | Jansen et al. |
| 2006/0091735 A1 | 5/2006 | Song et al. |
| 2006/0125243 A1 | 6/2006 | Miller |
| 2006/0131985 A1 | 6/2006 | Qu et al. |
| 2006/0152012 A1 | 7/2006 | Wiegel et al. |
| 2006/0152015 A1 | 7/2006 | Bywaters et al. |
| 2006/0152016 A1 | 7/2006 | Bywaters et al. |
| 2007/0020109 A1 | 1/2007 | Takahashi et al. |
| 2007/0116567 A1 | 5/2007 | Luetze |
| 2007/0187954 A1 | 8/2007 | Struve et al. |
| 2007/0187956 A1 | 8/2007 | Wobben |
| 2007/0222223 A1 | 9/2007 | Bagepalli et al. |
| 2007/0222226 A1 | 9/2007 | Casazza et al. |
| 2007/0222227 A1 | 9/2007 | Casazza et al. |
| 2008/0003105 A1 | 1/2008 | Nies |
| 2008/0025847 A1 | 1/2008 | Teipen |
| 2008/0050234 A1 | 2/2008 | Ingersoll et al. |
| 2008/0107526 A1 | 5/2008 | Wobben |
| 2008/0118342 A1 | 5/2008 | Seidel et al. |
| 2008/0197636 A1 | 8/2008 | Tilscher et al. |
| 2008/0197638 A1 | 8/2008 | Wobben |
| 2008/0246224 A1 | 10/2008 | Pabst et al. |
| 2008/0290664 A1 | 11/2008 | Kruger |
| 2008/0303281 A1 | 12/2008 | Krueger |
| 2008/0309189 A1 | 12/2008 | Pabst et al. |
| 2008/0315594 A1 | 12/2008 | Casazza et al. |

(56) References Cited

U.S. PATENT DOCUMENTS

| | | |
|---|---|---|
| 2009/0045628 A1 | 2/2009 | Erdman et al. |
| 2009/0060748 A1 | 3/2009 | Landa et al. |
| 2009/0094981 A1 | 4/2009 | Eggleston |
| 2009/0096309 A1 | 4/2009 | Pabst et al. |
| 2009/0302702 A1 | 12/2009 | Pabst et al. |
| 2010/0019502 A1 | 1/2010 | Pabst et al. |
| 2010/0026010 A1 | 2/2010 | Pabst |
| 2010/0117362 A1 | 5/2010 | Vihriala et al. |
| 2010/0123318 A1 | 5/2010 | Casazza et al. |

FOREIGN PATENT DOCUMENTS

| | | | |
|---|---|---|---|
| CN | 1554867 | 12/2004 | |
| DE | 1130913 | 6/1962 | |
| DE | 2164135 | 7/1973 | |
| DE | 2322458 | 11/1974 | |
| DE | 2506160 | 8/1976 | |
| DE | 2922885 | 12/1980 | |
| DE | 3638129 | 5/1988 | |
| DE | 3718954 | 12/1988 | |
| DE | 3844505 | 7/1990 | |
| DE | 3903399 | 8/1990 | |
| DE | 4304577 | 8/1994 | |
| DE | 4402184 | 8/1995 | |
| DE | 4415570 | 11/1995 | |
| DE | 4444757 | 6/1996 | |
| DE | 29706980 | 7/1997 | |
| DE | 19636591 | 3/1998 | |
| DE | 19644355 | 4/1998 | |
| DE | 19652673 | 6/1998 | |
| DE | 19711869 | 9/1998 | |
| DE | 19748716 | 11/1998 | |
| DE | 29819391 | 2/1999 | |
| DE | 19801803 | 4/1999 | |
| DE | 19932394 | 1/2001 | |
| DE | 19947915 | 4/2001 | |
| DE | 19951594 | 5/2001 | |
| DE | 10000370 | 7/2001 | |
| DE | 20102029 | 8/2001 | |
| DE | 10219190 | 11/2003 | |
| DE | 10246690 | 4/2004 | |
| DE | 102004018524 | 11/2005 | |
| DE | 102004028746 | 12/2005 | |
| DE | 102007042338 | 3/2009 | |
| EP | 0013157 | 7/1980 | |
| EP | 0232963 | 8/1987 | |
| EP | 0313392 | 4/1989 | |
| EP | 0627805 | 12/1994 | |
| EP | 1108888 | 6/2001 | |
| EP | 1167754 | 1/2002 | |
| EP | 1289097 | 3/2003 | |
| EP | 1291521 | 3/2003 | |
| EP | 1425840 | 3/2003 | |
| EP | 1309067 | 5/2003 | |
| EP | 1363019 | 11/2003 | |
| EP | 1375913 | 1/2004 | |
| EP | 1394406 | 3/2004 | |
| EP | 1394451 | 3/2004 | |
| EP | 2063117 | 5/2005 | |
| EP | 1589222 | 10/2005 | |
| EP | 1612415 | 1/2006 | |
| EP | 1641102 | 3/2006 | |
| EP | 1792381 | 3/2006 | |
| EP | 1677002 | 7/2006 | |
| EP | 1772624 | 4/2007 | |
| EP | 1780409 | 5/2007 | |
| EP | 1829762 | 9/2007 | |
| EP | 1881194 | 1/2008 | |
| EP | 1921311 | 5/2008 | |
| EP | 2102496 | 7/2008 | |
| EP | 2060786 | 5/2009 | |
| EP | 2063115 | 5/2009 | |
| EP | 2063116 | 5/2009 | |
| EP | 2143842 | 1/2010 | |
| EP | 2143938 | 1/2010 | |
| EP | 2143942 * | 1/2010 | F03D 9/00 |
| EP | 2143944 | 1/2010 | |
| ES | 2140301 | 2/2000 | |
| FR | 806292 | 12/1936 | |
| FR | 859844 | 12/1940 | |
| FR | 1348765 | 1/1964 | |
| FR | 2401091 | 3/1979 | |
| FR | 2445053 | 7/1980 | |
| FR | 2519483 | 7/1983 | |
| FR | 2594272 | 8/1987 | |
| FR | 2613148 | 3/1988 | |
| FR | 2760492 | 9/1998 | |
| FR | 2796671 | 1/2001 | |
| FR | 2798168 | 3/2001 | |
| FR | 2810374 | 12/2001 | |
| FR | 2882404 | 8/2006 | |
| GB | 191317268 | 3/1914 | |
| GB | 859176 | 1/1961 | |
| GB | 1524477 | 9/1978 | |
| GB | 1537729 | 1/1979 | |
| GB | 2041111 | 9/1980 | |
| GB | 2050525 | 1/1981 | |
| GB | 2075274 | 11/1981 | |
| GB | 2131630 | 6/1984 | |
| GB | 2144587 | 3/1985 | |
| GB | 2208243 | 3/1989 | |
| GB | 2266937 | 11/1993 | |
| GB | 2372783 | 9/2002 | |
| JP | 56081053 | 7/1981 | |
| JP | 57059462 | 4/1982 | |
| JP | 3145945 | 6/1991 | |
| JP | 5122912 | 5/1993 | |
| JP | 6002970 | 1/1994 | |
| JP | 6269141 | 9/1994 | |
| JP | 10-070858 | 3/1998 | |
| JP | 11236977 | 8/1999 | |
| JP | 11-299197 | 10/1999 | |
| JP | 2000-134885 | 5/2000 | |
| JP | 2001-057750 | 2/2001 | |
| JP | 2004-153913 | 5/2004 | |
| JP | 2004-297947 | 10/2004 | |
| JP | 2005-006375 | 1/2005 | |
| JP | 2005-020906 | 1/2005 | |
| JP | 2005-312150 | 11/2005 | |
| NL | 8902534 | 5/1991 | |
| RU | 2000466 | 9/1993 | |
| RU | 2229621 | 5/2004 | |
| WO | WO8402382 | 6/1984 | |
| WO | WO9105953 | 5/1991 | |
| WO | WO9212343 | 7/1992 | |
| WO | WO9730504 | 8/1997 | |
| WO | WO9733357 | 9/1997 | |
| WO | WO9840627 | 9/1998 | |
| WO | WO9930031 | 6/1999 | |
| WO | WO9933165 | 7/1999 | |
| WO | WO9937912 | 7/1999 | |
| WO | WO9939426 | 8/1999 | |
| WO | WO0001056 | 1/2000 | |
| WO | WO0106121 | 1/2001 | |
| WO | WO0106623 | 1/2001 | |
| WO | WO0107784 | 2/2001 | |
| WO | WO0121956 | 3/2001 | |
| WO | WO0125631 | 4/2001 | |
| WO | WO0129413 | 4/2001 | |
| WO | W00135517 | 5/2001 | |
| WO | WO0134973 | 5/2001 | |
| WO | WO0169754 | 9/2001 | |
| WO | WO0233254 | 4/2002 | |
| WO | WO02057624 | 7/2002 | |
| WO | WO02083523 | 10/2002 | |
| WO | WO03036084 | 5/2003 | |
| WO | WO03067081 | 8/2003 | |
| WO | WO03076801 | 9/2003 | |
| WO | WO2004017497 | 2/2004 | |
| WO | WO2004042227 | 5/2004 | |
| WO | WO2005103489 | 11/2005 | |
| WO | WO2006013722 | 2/2006 | |
| WO | WO2006032515 | 3/2006 | |

(56) References Cited

FOREIGN PATENT DOCUMENTS

| WO | WO2007063370 | 6/2007 |
| WO | WO2007110718 | 10/2007 |
| WO | WO2008052562 | 5/2008 |
| WO | WO2008086608 | 7/2008 |
| WO | WO2008098573 | 8/2008 |
| WO | WO2008102184 | 8/2008 |
| WO | WO2008116463 | 10/2008 |
| WO | WO2008131766 | 11/2008 |

OTHER PUBLICATIONS

Variable Speed Gearless Wind Turbine (website), http://www.mhi.cojp/msmw/mw/en/gearless.html, viewed on Sep. 22, 2006.

Italian Search Report dated Mar. 22, 2011 for IT MI20100694.

* cited by examiner

WIND POWER TURBINE ELECTRIC GENERATOR AND WIND POWER TURBINE EQUIPPED WITH AN ELECTRIC GENERATOR

PRIORITY CLAIM

This application claims the benefit of and priority to Italian Patent Application No. MI2010A 000694, filed on Apr. 22, 2010, the entire contents of which are incorporated by reference herein.

BACKGROUND

Certain known electric generators normally comprise a tubular first supporting structure extending about an axis of rotation; a second supporting structure extending about the axis of rotation, substantially coaxial with the first supporting structure, and fitted to the first supporting structure to rotate about the axis of rotation; first active parts fitted to the first supporting structure; and second active parts fitted to the second supporting structure, facing the first active parts, and separated from the first active parts by an annular gap.

Known electric generators of this type are widely used on wind power turbines. More recently, permanent-magnet synchronous electric generators have also been used, particularly on direct-drive wind power turbines (i.e., comprising a blade assembly connected directly to the electric generator, with no gearboxes in between). Examples of direct-drive wind power turbines equipped with permanent-magnet synchronous electric generators are described in documents EP Patent No. 1,425,840; EP Patent No. 1,792,381; EP Patent No. 2,102,496; EP Patent No. 2,063,115; EP Patent No. 2,063,116; EP Patent No. 2,063,117; EP Patent No. 2,143,938; EP Patent No. 2,143,942; and EP Patent No. 2,143,944.

Though: (a) direct-drive wind power turbines are more efficient mechanically and cheaper to maintain than gearbox types, and (b) synchronous electric generators are more efficient electrically than asynchronous types; direct-drive wind power turbines are characterized by fairly low rotation speed, which, combined with the need for more and more electric power, makes it necessary to employ permanent-magnet synchronous electric generators with numerous poles and a high maximum torque, and therefore large-size electric generators which can pose structural problems.

The first supporting structure and first active parts define the stator or rotor of the electric generator, and the second supporting structure and second active parts define the rotor or stator, so the larger the electric generator is, the larger the first and second supporting structures are. Moreover, because it weighs on the wind power turbine structure as a whole, the weight of the electric generator must be maintained within given limits, over and above which a larger, more expensive wind power turbine is needed. Also, it is preferable that the first and second supporting structure not be too massive or heavy.

The first supporting structure is often defined by a tubular structure which, besides supporting the first active parts, also defines a load-bearing structural element of the wind power turbine as a whole, as shown, for example, in EP Patent No. 1,425,840 and EP Patent No. 2,102,496. As a result, the first supporting structure is subject to a normally small amount of strain, particularly during assembly but also possibly during operation of the electric generator. Even a small amount of strain of the first supporting structure, however, may have serious effects, by modifying the annular gap between the first and second active parts and so impairing operation of the electric generator. The normal practice, in fact, is to minimize the radial size of the annular gap to increase the efficiency of the electric generator and reduce flux dispersion, but it is often necessary to oversize the annular gap to prevent strain of the first supporting structure from affecting the electric generator.

SUMMARY

The present disclosure relates to a wind power turbine electric generator.

In one embodiment, the present disclosure relates to an electric generator for a direct-drive wind power turbine.

It is an object of the present disclosure to provide an electric generator configured to reduce certain of the drawbacks of the known art.

Another object of the present disclosure is to provide an electric generator configured to give maximum efficiency when installed on a wind power turbine.

According to one embodiment of the present disclosure, there is provided an electric generator for a wind power turbine; the electric generator comprising: a tubular first supporting structure extending about an axis of rotation; a second supporting structure extending about the axis of rotation, substantially coaxial with the first supporting structure, and fitted to the first supporting structure to rotate about the axis of rotation; first active parts fitted to the first supporting structure; second active parts fitted to the second supporting structure, facing the first active parts, and separated from the first active parts by an annular gap; and a radial tensioning device configured to adjust the shape of the first supporting structure about the axis of rotation.

The circular shape of the first supporting structure can thus be adjusted to control and if necessary correct the radial size of the annular gap.

In one embodiment of the present disclosure, the radial tensioning device comprises an annular plate; and a number of radial arms extending from the annular plate to the first supporting structure.

The annular plate thus provides a high degree of structural rigidity, while the radial arms allow forces to be exchanged between different parts of the first supporting structure, and permit local deformation of the first supporting structure to correct any flaws in its circular shape.

More specifically, each radial arm is connected to the annular plate to slide radially with respect to the axis of rotation, and is fixable to the annular plate.

In another embodiment of the present disclosure, the electric generator comprises a bearing between the radial tensioning device and the second supporting structure.

The radial tensioning device thus provides for correcting the circular shape of the first supporting structure, and coaxial alignment of the first and second supporting structure.

Additional features and advantages are described in, and will be apparent from, the following Detailed Description and the figures.

BRIEF DESCRIPTION OF THE DRAWINGS

A number of non-limiting embodiments of the present disclosure will be described by way of example with reference to the accompanying drawings, in which.

DETAILED DESCRIPTION

Figure 1:
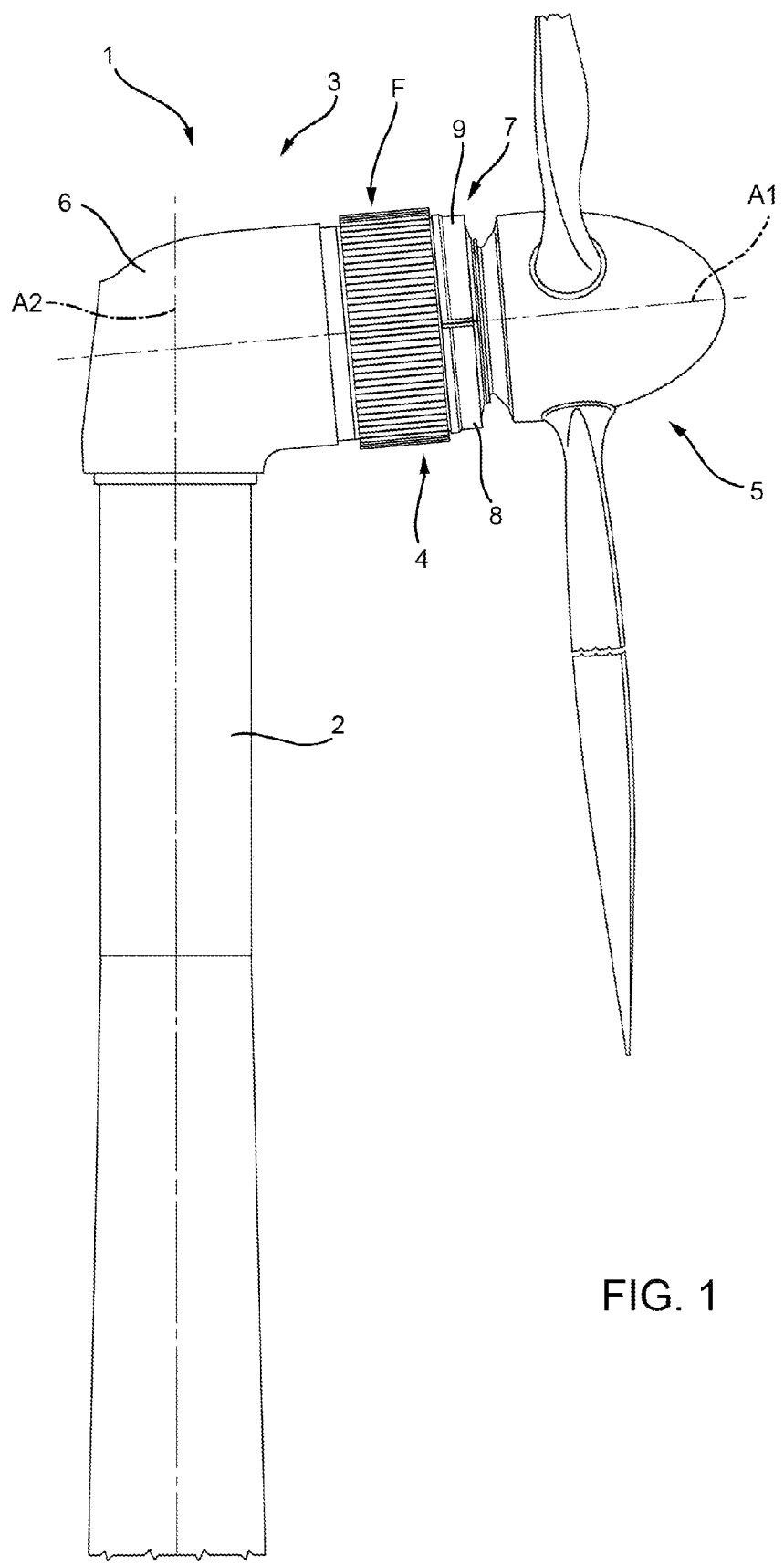
FIG. 1 shows a side view, with parts removed for clarity, of a wind power turbine.

Referring now to the example embodiments of the present disclosure illustrated in FIGS. 1 to 5, number 1 in FIG. 1 indicates as a whole a direct-drive wind power turbine for generating electric power, and which comprises a vertical support 2; a nacelle 3; an electric generator 4; and a rotary assembly 5 fitted to nacelle 3 to rotate about an axis of rotation A1. Nacelle 3 is in turn fitted to vertical support 2 to rotate about an axis of rotation A2; and, in the example shown, electric generator 4 is a permanent-magnet synchronous electric generator.

Nacelle 3 is substantially a tubular member supporting rotary assembly 5, which extends partly inside and partly outside nacelle 3. In the example shown, nacelle 3 comprises a curved tubular member 6; part of electric generator 4; and a ring 7 comprising two complementary sectors 8 and 9 connected about axis of rotation A1.

Figure 2:
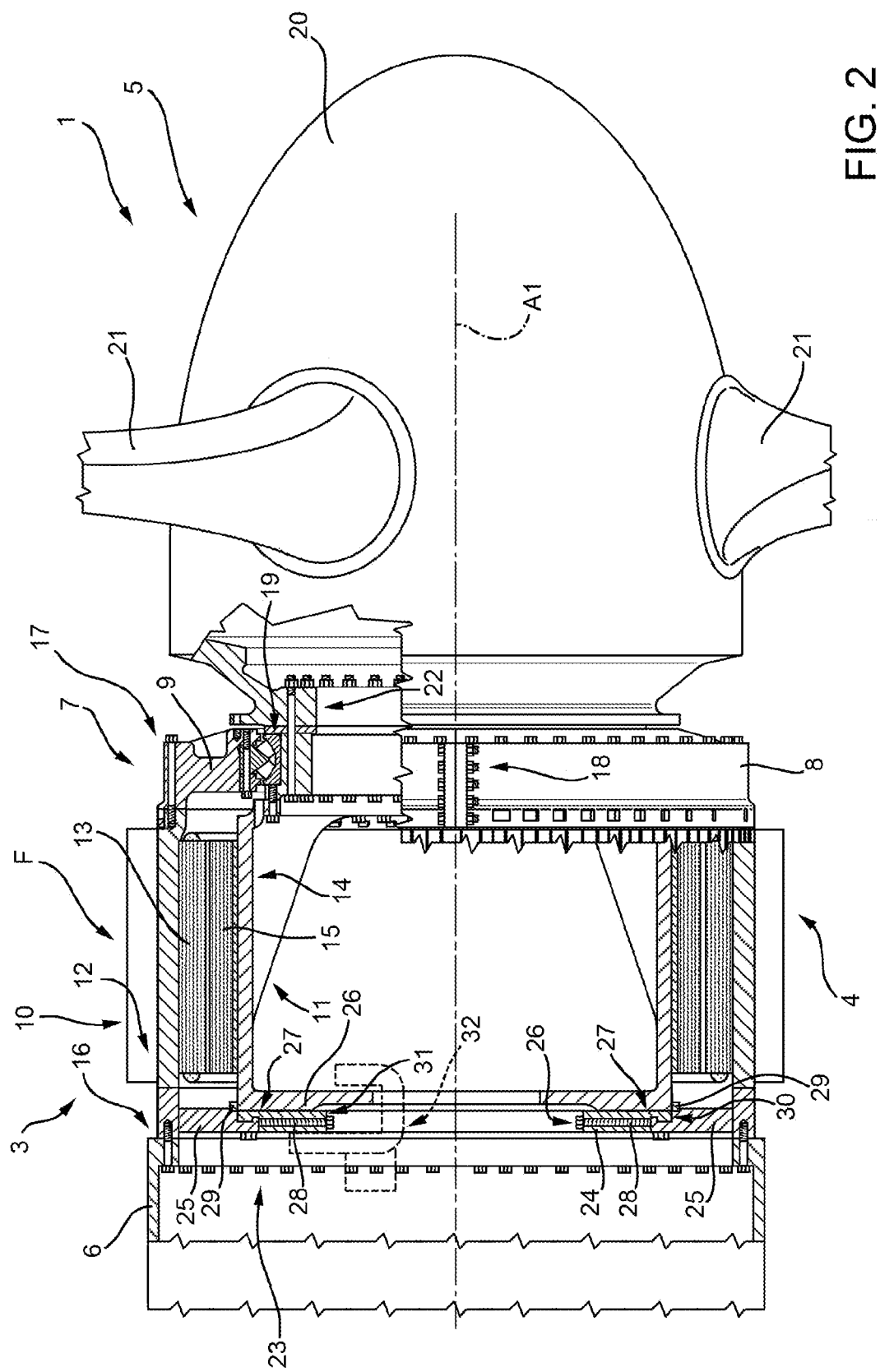
FIG. 2 shows a larger-scale, partly sectioned side view, with parts removed for clarity, of the FIG. 1 wind power turbine.

With reference to FIG. 2, electric generator 4 is tubular, and comprises a stator 10 and a rotor 11. Stator 10 comprises a tubular supporting structure 12; and active parts 13—in the example shown, stator segments—arranged about axis of rotation A1 and fixed to the inner face of supporting structure 12. Rotor 11 comprises a tubular supporting structure 14; and active parts 15—in the example shown, rotor segments—arranged about axis of rotation A1 and fixed to the outer face of supporting structure 14. More specifically, nacelle 3 comprises curved tubular member 6; stator 10, or rather supporting structure 12 of stator 10; and ring 7.

Active parts 13 comprise stator segments parallel to axis of rotation A1. Each stator segment comprises a magnetic gap and at least one electric winding, and is of the type described in EP Patent No. 1,792,381.

Active parts 15 comprise rotor segments parallel to axis of rotation A1. Each rotor segment comprises a magnetic gap and permanent magnets, and is of the type described in EP Patent No. 1,792,381.

Supporting structure 12 has two opposite flanged ends fixed to curved tubular member 6 and ring 7 by respective bolted joints 16 and 17. Specifically, ring 7 is fitted slidably to supporting structure 12, and is locked in position by bolted joint 17. More specifically, sectors 8 and 9 are each semicircular in shape, and are connected by two bolted joints 18 to form ring 7. In the example shown, sector 8 is located below sector 9. Wind power turbine 1 comprises a bearing 19 between nacelle 3 and rotary assembly 5. In the example shown, wind power turbine 1 comprises a single bearing 19 capable of withstanding axial and radial stress between nacelle 3 and rotary assembly 5; it being understood, however, that the specific configuration shown in the drawings and described herein in no way limits the protective scope of the present disclosure. Bearing 19 is fitted to the inside of ring 7, is fixed directly to sectors 8 and 9 in the example shown, and is fixed to the outside of rotary assembly 5.

Rotary assembly 5 comprises rotor 11, a hub 20, and blades 21 fitted to hub 20. In the example shown, rotary assembly 5 also comprises a connecting member 22 located between rotor 11 and hub 20, and at and substantially inside bearing 19. More specifically, bearing 19 is fixed directly to connecting member 22; and hub 20 is connected directly to rotor 11, which rotates at the same speed as hub 20.

Electric generator 4 generally comprises supporting structure 12, which extends about axis of rotation A1; supporting structure 14, which extends about axis of rotation A1, is substantially coaxial with supporting structure 12, and is fitted to supporting structure 12 to rotate about axis of rotation A1; active parts 13 fitted to supporting structure 12; and active parts 15 fitted to supporting structure 14, facing active parts 13, and separated from active parts 13 by an annular gap. Electric generator 4 also comprises a radial tensioning device 23 configured to adjust the shape of supporting structure 12 about axis of rotation A1, (i.e., to correct any deformation, ovalization, or any other flaw in the circular shape of the inner face of supporting structure 12), so as to maintain as circular a shape as possible of supporting structure 12.

In the example shown, radial tensioning device 23 is located inside supporting structure 12 and is annular in shape.

Figure 3:
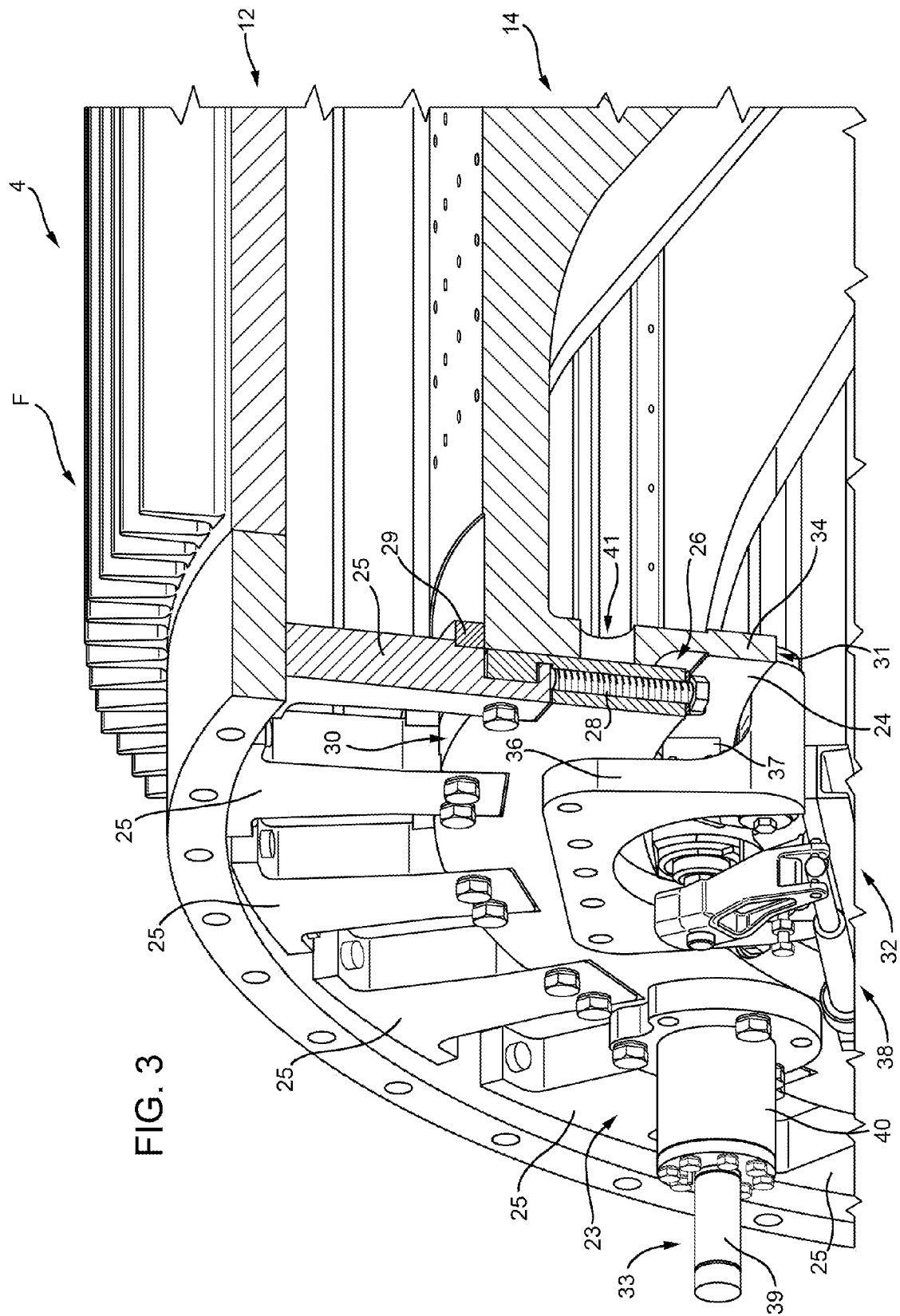
FIG. 3 shows a larger-scale, partly sectioned view in perspective, with parts removed for clarity, of a detail in FIG. 2.

More specifically, and as shown in FIG. 3, radial tensioning device 23 comprises an annular plate 24; and a number or quantity of radial arms 25 extending from annular plate 24 to supporting structure 12, and equally spaced about axis of rotation A1.

Each radial arm 25 is connected to annular plate 24 to slide radially with respect to axis of rotation A1 (FIG. 2), and is fixable to annular plate 24.

Radial tensioning device 23 comprises a number or quantity of adjusting mechanisms or adjustors 26, each associated with a respective radial arm 25 to slide radial arm 25 radially with respect to annular plate 24. That is, annular plate 24 comprises a number or quantity of seats 27, each for housing a respective radial arm 25; each adjusting mechanism or adjustor 26 comprises a screw 28 housed inside annular plate 24 and for pushing respective radial arm 25 outwards against supporting structure 12; and each radial arm 25 is fixed releasably to supporting structure 12.

Each radial arm 25 comprises a projection 29 located between supporting structures 12 and 14, close to supporting structure 14, and configured to prevent relative radial movements between supporting structures 12 and 14. In other words, projection 29 is made of low-friction material to permit relative rotation between supporting structures 12 and 14, even when projection 29 is positioned contacting supporting structure 14.

With reference to FIG. 2, active parts 13 and active parts 15 are in the form of segments extending parallel to axis of rotation A1, and are equal in number. The number or quantity of radial arms 25 is less than or equal to the number of active parts 13 and active parts 15, so that removal of one radial arm 25 extracts at least one segment of active parts 13 or one segment of active parts 15. The number of radial arms 25 may even be a multiple of, such as twice, the number of active parts, so that removing two radial arms 25 extracts a segment of active parts 13 or a segment of active parts 15, though this solution is not as advantageous as the previous one.

Accordingly, annular plate 24 has an outer edge 30 smaller in diameter than the maximum diameter of supporting structure 12, so as not to obstruct extraction of the segments of active parts 15; and an inner edge 31 defining a manhole opening.

With reference to FIG. 3, electric generator 4 comprises a brake 32; and locking devices 33 (only one shown in FIG. 4) arranged about axis of rotation Al. Brake 32 comprises a brake disk 34; and a number or quantity of brake calipers 35 (shown in FIG. 4) arranged about axis of rotation Al. Brake disk 34 is integral with supporting structure 14, and is defined by an annular plate parallel to annular plate 24 and extending inside supporting structure 14. Each brake caliper 35 comprises a frame 36 fixed to annular plate 24; two jaws 37 mounted on opposite sides of brake disk 34; and an actuating mechanism 38 for activating jaws 37 (only one shown in FIG. 3) to selectively grip brake disk 34. Each locking device 33 comprises a pin 39; and an actuator 40 fixed to annular plate 24 to move pin 39 between a rest position (FIG. 3) and a work position (not shown). Brake disk 34 comprises a number or quantity of holes 41 arranged about axis of rotation A1 and engaged by pin 39 when pin 39 is in the work position.

Figure 4:
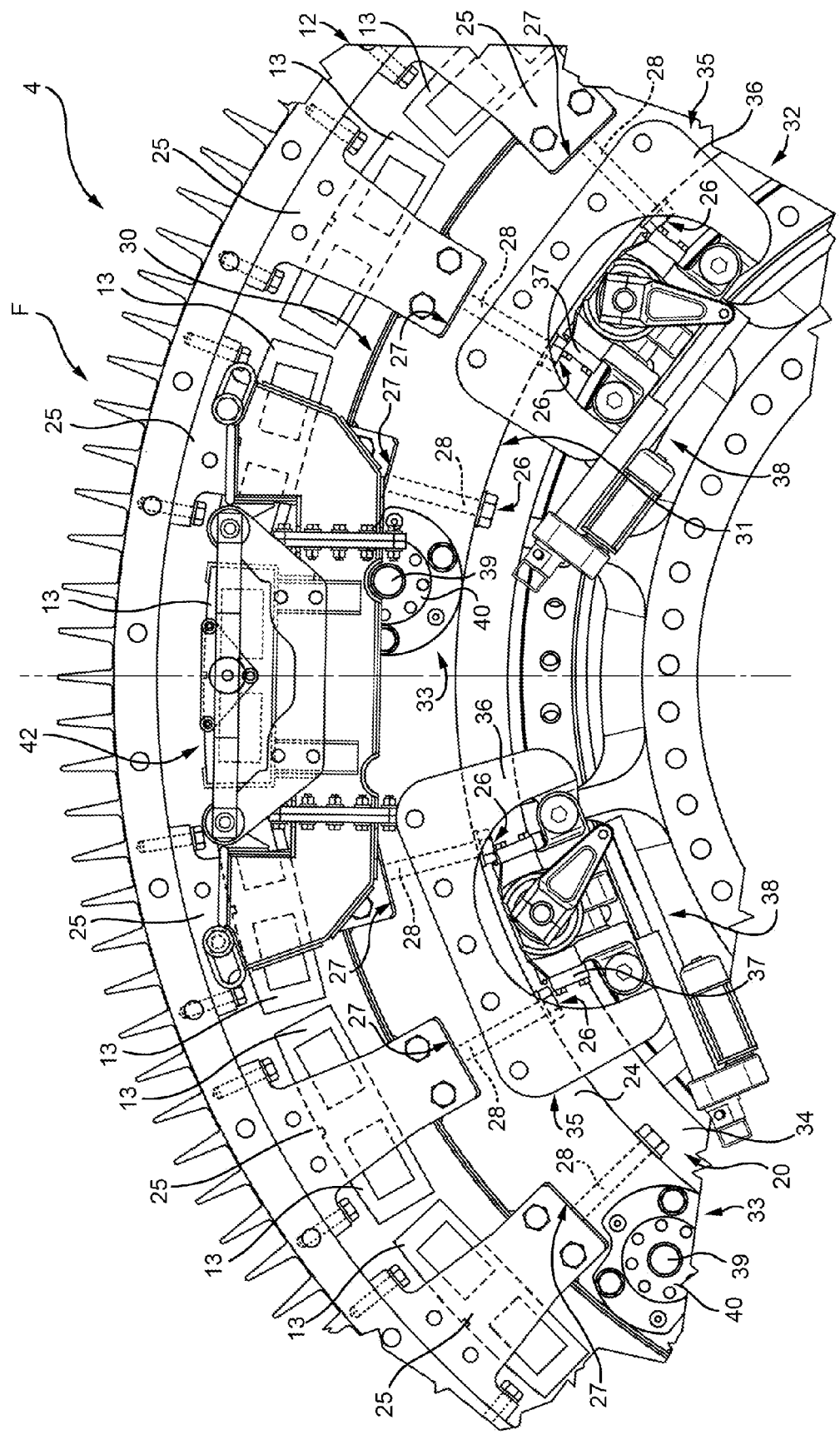
FIG. 4 shows a front view, with parts removed for clarity, of a detail in FIG. 2.

FIG. 4 shows electric generator 4 in a locked configuration (i.e., in which locking devices 33 lock supporting structures 12 and 14 with respect to each other). Also, as seen in FIG. 4, electric generator 4 is less one radial arm 25 and fitted with an extracting device 42, which is fitted to the two radial arms 25 adjacent to the missing radial arm 25, and serves to extract a segment of active parts 13 and/or 15 at the missing radial arm.

The outer face of supporting structure 12 is fitted with cooling fins F.

Figure 5:
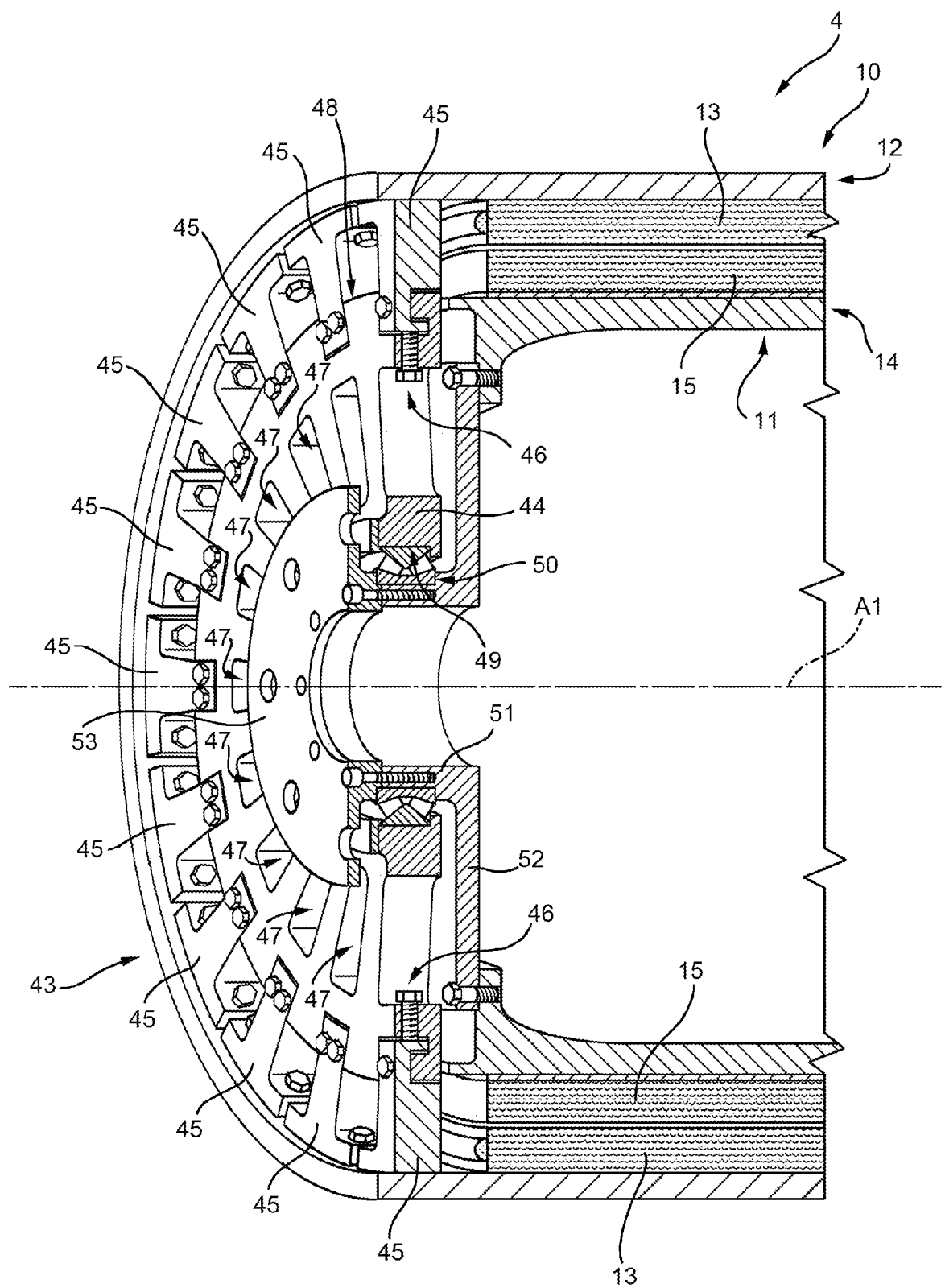
FIG. 5 shows a partly sectioned view in perspective, with parts removed for clarity, of an alternative embodiment of the present disclosure.

In FIG. 5, radial tensioning device 23 is replaced by a radial tensioning device 43, which, in addition to correcting the circular shape of supporting structure 12, also serves to connect supporting structures 12 and 14 in rotary manner about axis of rotation A1.

Like radial tensioning device 23, radial tensioning device 43 comprises an annular plate 44; and a number or quantity of radial arms 45 extending from annular plate 44 to supporting structure 12, and equally spaced about axis of rotation A1. Each radial arm 45 is connected to annular plate 44 to slide radially with respect to axis of rotation A1 (FIG. 2), and is fixable to annular plate 44. Radial tensioning device 43 comprises a number or quantity of adjusting mechanisms 46, each associated with a respective radial arm 45 to slide radial arm 45 radially with respect to annular plate 44. In the FIG. 5 example, annular plate 44 comprises openings 47 configured and located to enable use of adjusting mechanisms or adjustors 46 similar to adjusting mechanisms or adjustors 26. Annular plate 44 comprises an outer edge 48 and an inner edge 49 of the same size as outer edge 30 and inner edge 31 (FIG. 3).

Electric generator 4 comprises a bearing 50 between radial tensioning device 43 and supporting structure 14. That is, inner edge 49 of radial tensioning device 43 contacts bearing 50; and rotor 11 comprises a ring 51 located inside bearing 50, and a flange 52 connecting ring 51 to supporting structure 14. Electric generator 4 also comprises a disk 53 fixed to ring 51, and which may also be used as a brake disk. Generally speaking, radial tensioning device 43 can be fitted with a brake and locking devices 33 as shown in FIGS. 3 and 4 of the previous embodiment of the disclosure.

The radial tensioning device in the FIG. 5 embodiment provides for simultaneously adjusting the circular shape of supporting structure 12, and coaxial alignment of supporting structures 12 and 14.

In one alternative embodiment (not shown), ring 7 is eliminated, and stator 10 and bearing 19 are connected in accordance with alternative embodiments, as described, for example, in EP Patent No. 1,425,840.

It should be appreciated that in the above description, specific reference is made repeatedly, for the sake of simplicity, to bolted joints, which are intended to include joints made using bolts and nuts, or screws screwed directly into one of the parts for connection, and may be replaced by any other type of suitable releasable joint.

Clearly, changes may be made to the electric generator and wind power turbine as described herein without, however, departing from the scope of the accompanying Claims.

The invention is claimed as follows:

1. A wind power turbine electric generator comprising:
    a tubular first supporting structure extending about an axis of rotation, wherein an inner face of said first supporting structure has a tubular shape;
    a second supporting structure extending about the axis of rotation, said second supporting structure substantially coaxial with the first supporting structure, and fitted to the first supporting structure, said second supporting structure configured to rotate about the axis of rotation;
    a plurality of first active parts fitted to the first supporting structure;
    a plurality of second active parts fitted to the second supporting structure, said second active parts facing the first active parts, and separated from the first active parts by an annular gap; and
    a radial tensioning device configured to adjust the tubular shape of the inner face of the first supporting structure about the axis of rotation.

2. The wind power turbine electric generator of claim 1, wherein the radial tensioning device is located inside the first supporting structure.

3. The wind power turbine electric generator of claim 1, wherein the radial tensioning device is annular.

4. The wind power turbine electric generator of claim 1, wherein the radial tensioning device includes:
    an annular plate, and
    a quantity of radial arms extending from the annular plate to the first supporting structure.

5. The wind power turbine electric generator of claim 4, wherein each of the radial arms is connected to the annular plate, each of the radial arms is configured to slide radially with respect to the axis of rotation, and each of the radial arms is fixable to the annular plate.

6. The wind power turbine electric generator of claim 5, wherein the radial tensioning device includes a quantity of adjustors, each associated with one of the radial arms and configured to slide said radial arm with respect to the annular plate.

7. The wind power turbine electric generator of claim 4, wherein each of the radial arms is releasably fixed to the first supporting structure.

8. The wind power turbine electric generator of claim 4, wherein each of the radial arms includes a projection located between the first supporting structure and the second supporting structure, said projection configured to prevent relative radial movements between the first supporting structure and the second supporting structure.

9. The wind power turbine electric generator of claim 8, wherein said projection of each of the radial arms is adjacent to the second supporting structure.

10. The wind power turbine electric generator of claim 4, wherein the plurality of first active parts and plurality of second active parts are equal in quantity.

11. The wind power turbine electric generator of claim 10, wherein the quantity of radial arms is selected from a group consisting of: a quantity less than the quantity of the first active parts, a quantity equal to the quantity of the first active parts, a quantity equal to a multiple of the quantity of the first active parts.

12. The wind power turbine electric generator of claim 4, including at least one locking device which includes:
    a pin parallel to the axis of rotation, said pin supported by the annular plate and configured to selectively move parallel to the axis of rotation, and a disk parallel to the annular plate and having at least one hole which is engaged by the pin when the pin is in a working position.

13. The wind power turbine electric generator of claim 4, including a brake which includes:
   a brake disk parallel to the annular plate and fixed to the second supporting structure, and
   at least one brake caliper fitted to the annular plate and including two jaws configured to selectively grip the brake disk.

14. The wind power turbine electric generator of claim 1, which includes a bearing located between the radial tensioning device and the second supporting structure.

15. The wind power turbine electric generator of claim 1, wherein the second supporting structure is tubular.

16. A wind power turbine comprising:
   a vertical structure;
   a nacelle located on a top of the vertical structure;
   a blade assembly fitted to the nacelle and configured to rotate; and
   an electric generator including:
      a tubular first supporting structure extending about an axis of rotation, wherein an inner face of said first supporting structure has a tubular shape;
      a second supporting structure extending about the axis of rotation, said second supporting structure substantially coaxial with the first supporting structure, and fitted to the first supporting structure, said second supporting structure configured to rotate about the axis of rotation;
      a plurality of first active parts fitted to the first supporting structure;
      a plurality of second active parts fitted to the second supporting structure, said second active parts facing the first active parts, and separated from the first active parts by an annular gap; and
      a radial tensioning device configured to adjust the tubular shape of the inner face of the first supporting structure about the axis of rotation.

17. The wind power turbine of claim 16, wherein the blade assembly is connected directly to the second supporting structure.

18. The wind power turbine of claim 16, wherein the first supporting structure partly defines the nacelle.

19. The wind power turbine of claim 16, which includes a plurality of cooling fins located along an outer face of the first supporting structure.

20. A wind power turbine electric generator radial tensioning device comprising:
   an annular plate, and
   a quantity of radial arms configured to extend from the annular plate to a tubular first supporting structure of a wind power turbine electric generator, the tubular first supporting structure extending about an axis of rotation and the quantity of radial arms configured to adjust a tubular shape of an inner face of the first supporting structure about the axis of rotation, wherein the wind power turbine electric generator includes the first supporting structure, a second supporting structure extending about the axis of rotation, said second supporting structure substantially coaxial with the first supporting structure, and fitted to the first supporting structure, said second supporting structure configured to rotate about the axis of rotation, a plurality of first active parts fitted to the first supporting structure, and a plurality of second active parts fitted to the second supporting structure, said second active parts facing the first active parts, and separated from the first active parts by an annular gap.

21. The wind power turbine electric generator radial tensioning device of claim 20, wherein each of the radial arms is connected to the annular plate, each of the radial arms is configured to slide radially with respect to the axis of rotation, and each of the radial arms is fixable to the annular plate.

22. The wind power turbine electric generator radial tensioning device of claim 21, wherein the radial tensioning device includes a quantity of adjustors, each associated with one of the radial arms and configured to slide said radial arm with respect to the annular plate.

23. A wind power turbine electric generator comprising:
   a tubular first supporting structure extending about an axis of rotation;
   a second supporting structure extending about the axis of rotation, said second supporting structure substantially coaxial with the first supporting structure, and fitted to the first supporting structure, said second supporting structure configured to rotate about the axis of rotation;
   a plurality of first active parts fitted to the first supporting structure;
   a plurality of second active parts fitted to the second supporting structure, said second active parts facing the first active parts, and separated from the first active parts by an annular gap; and
   a radial tensioning device configured to adjust a shape of the first supporting structure about the axis of rotation, said radial tensioning device including:
      an annular plate, and
      a quantity of radial arms extending from the annular plate to the first supporting structure, each of the radial arms connected to the annular plate, each of the radial arms configured to slide radially with respect to the axis of rotation, and each of the radial arms fixable to the annular plate.

* * * * *